May 22, 1928. 1,670,446
J. R. GAMMETER
METHOD AND APPARATUS FOR MAKING PNEUMATIC TIRES
Filed Feb. 14, 1927 4 Sheets-Sheet 1
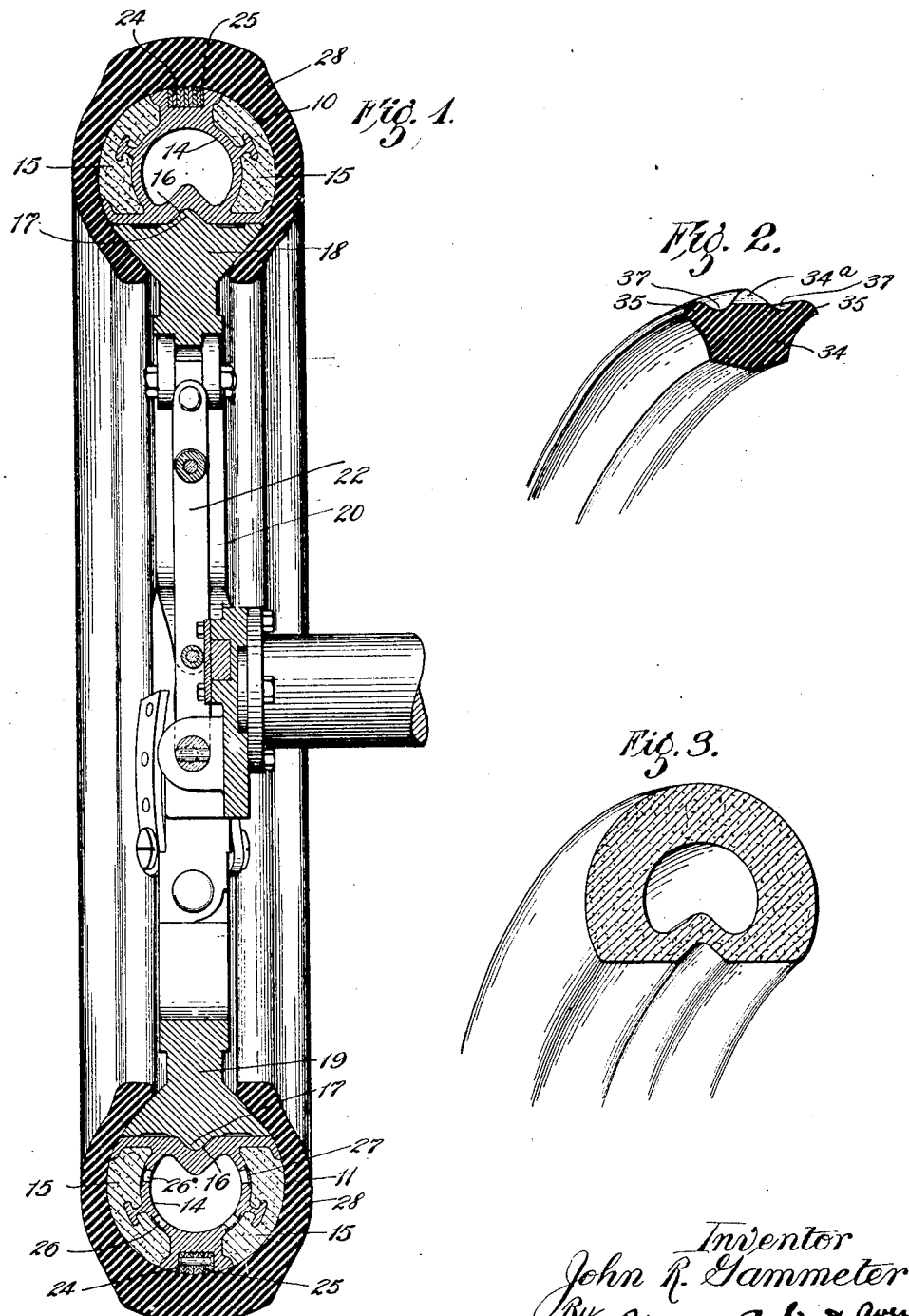

May 22, 1928. 1,670,446
J. R. GAMMETER
METHOD AND APPARATUS FOR MAKING PNEUMATIC TIRES
Filed Feb. 14, 1927 4 Sheets-Sheet 2

Inventor
John R. Gammeter
By Pinson, Eakin & Avery
Attys.

May 22, 1928.
J. R. GAMMETER
1,670,446
METHOD AND APPARATUS FOR MAKING PNEUMATIC TIRES
Filed Feb. 14, 1927     4 Sheets-Sheet 4
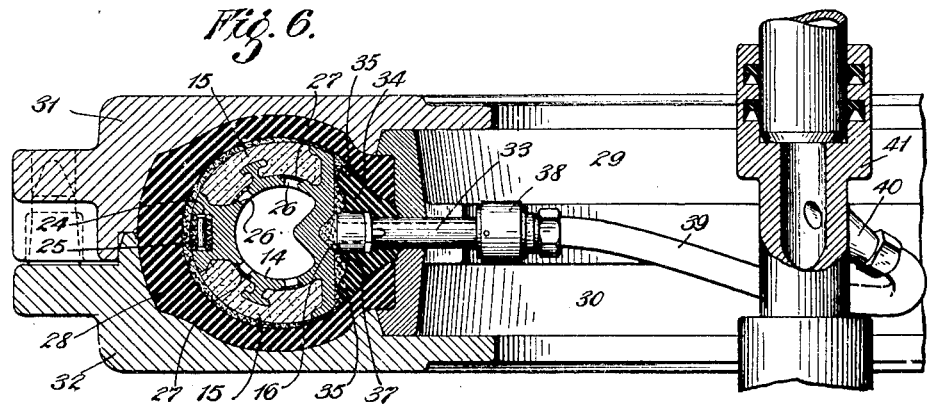
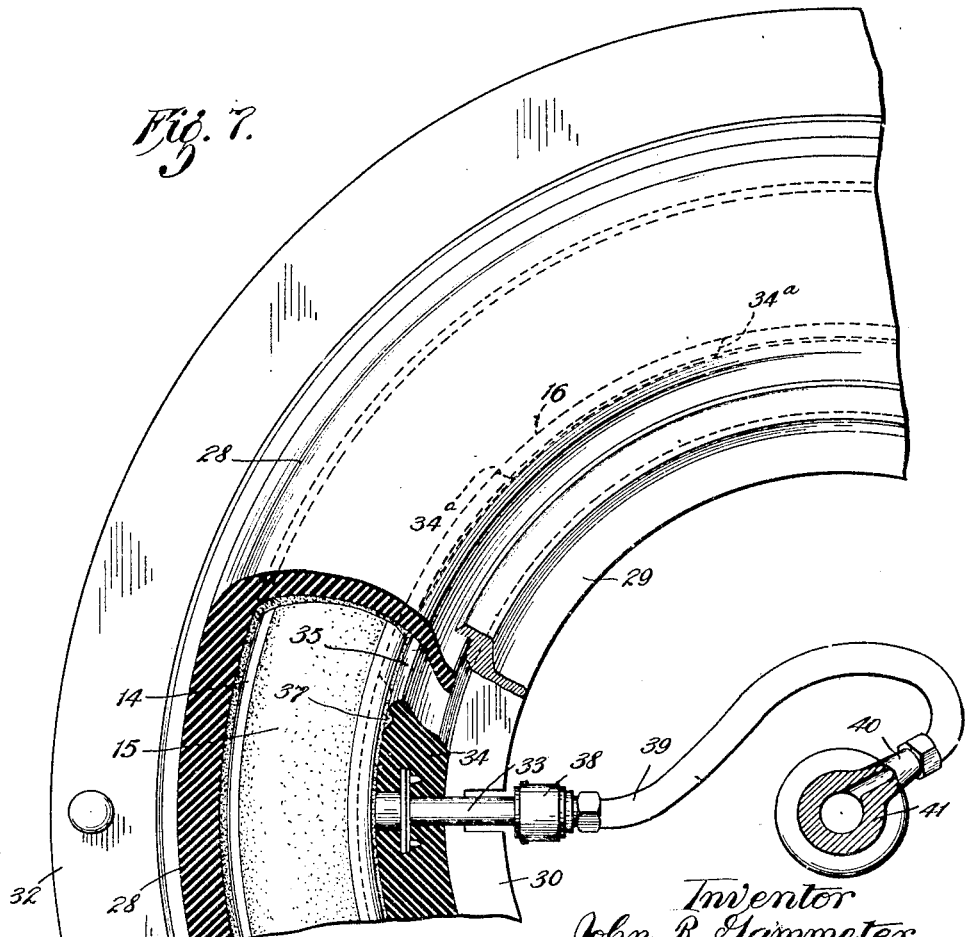

Patented May 22, 1928.

1,670,446

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

METHOD AND APPARATUS FOR MAKING PNEUMATIC TIRES.

Application filed February 14, 1927. Serial No. 167,899.

This invention relates to methods and apparatus for making pneumatic tires and in some of its features is an improvement upon that of my copending application Ser. No. 114,052, filed June 7, 1926, wherein a pneumatic tire is expanded against an enclosing mold by a material in plastic form.

An important object of the present invention is to provide more conveniently and to provide more effectively against ply-separation in a tire expanded by means of a flowable material in direct contact with the interior surface of the casing, such as occurs when the distending material, passing through one or more of the inner plies of the tire, lifts the other plies therefrom, or when the softening of the heated rubber of the inner plies, after they have been stretched outward in a cool and impervious condition, permits the cords to retract and thus causes apertures to form in the soft rubber and permits the distending material to enter between the plies.

Further objects are to avoid the necessity of using a thick rubber coating for the interior surface of the tire such as has been found necessary when the tire is distended by a fluid in direct contact therewith; to avoid such adhesion of the distending material to the tire and to contacted parts of the apparatus as to render inconvenient, expensive or laborious the matter of cleaning it therefrom; and in general to reduce the expense of manufacturing pneumatic tires vulcanized in distended condition. Subsidiary objects are to render practicable the use of a comparatively moist and flowable distending material and thus to permit conducting the material into the tire from a comparatively distant supply mass of the material under pressure; to reduce the plasticity of a distending material before or during vulcanization, as by lessening its moisture content; and to provide for facilitating the flow of the distending material through the apparatus and into the tire and thus to provide a comparatively high pressure of the material within the tire as the result of a given pressure upon the supply mass of the material exterior to the tire.

Of the accompanying drawings:

Fig. 1 is a section on line 1—1 of Fig. 4 of a tire-building core with a tire mounted thereon and a collapsible chuck or spider for supporting the core, illustrating certain features of my invention in its preferred form.

Fig. 2 is a perspective view of a sectional portion of a bull ring for closing the space between the beads of the tire during the molding or during the molding and vulcanizing of the tire.

Fig. 3 is a perspective view of a section portion of a tire-building core of modified form.

Fig. 6 is a vertical section of parts of the apparatus shown in Fig. 5, including a tire mold.

Fig. 7 is a plan view, with parts in section and parts removed, of the assembly shown in Fig. 6.

Figure 4:
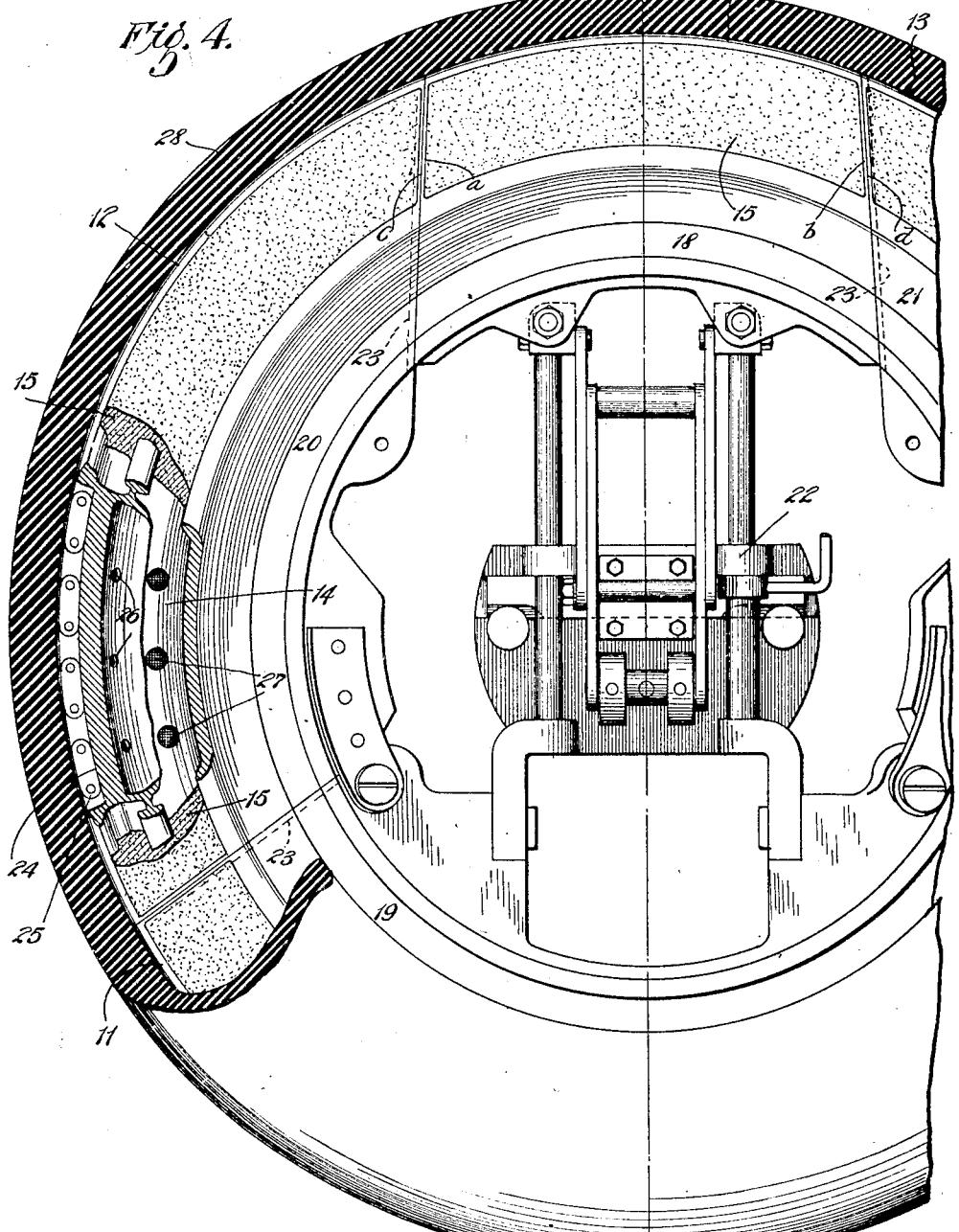
Fig. 4 is a view from the left of Fig. 1 of the assembly there shown, parts being sectioned and broken away.

Referring to the drawings, the tire is preferably built upon a rigid, sectional, absorbent tire-building core comprising sections 10, 11, 12, 13 of which each section comprises a hollow and consequently light inner metal body 14 and outer bodies 15, 15 of porous material such as plaster of Paris secured thereon.

The plaster of Paris, adapted to receive moisture from a plastic distending material in the molding of the tire, to stiffen the plastic material, is preferably mixed with a suitable proportion of a filler such as Keene cement or tiling cement, to prevent such excessive porosity in the plaster of Paris as would result in a premature stiffening of the plastic, before the complete distending and molding of the tire.

The metal body of the core section preferably is formed with interlocking portions as shown, with which the plaster of Paris is interlocked by casting it thereon. I do not wholly limit my invention, however, to this type of absorbent or porous core, or in fact to any tire-building core, as the tire may be built in flat-band form and thereafter expanded to tire shape.

The sections of the absorbent core are so formed that its inner periphery in assembled condition is of substantially greater diameter than the bead diameter of the tire to be built thereon and the sections are so formed as to provide at the inner periphery of the assembly a circumferential groove 16 adapted to receive and interlock against relative axial movement with an annular rib 17 made up of ribs formed upon the outer faces of a set of metal core sections 18, 19, 20, 21 which are mounted upon a collapsible chuck or spider 22 and adapted to constitute the inner peripheral portion of the composite tire-building core. The chuck 22 here shown is of standard construction and need not further be described.

The core sections 18 to 21 are preferably formed on their end faces with interfitting tongues and grooves such as heretofore have been employed in the case of collapsible tire-building cores of full section, as indicated at 23, 23, to assure proper alignment of the sections circumferentially.

To restrain the absorbent core sections 10 to 13 against outward movement and thus to retain them in snugly assembled relation to the metal core sections 18 to 21 the outer, absorbent core sections are formed at their tread portions with respective longitudinally-disposed grooves adapted to register with each other when the sections are in assembled relation and thus to constitute a complete annular groove 24 in which fits a flexible, annular retaining member such as the chain 25, adapted to be flexed for subsequent removal from a tire built upon the core structure. The chain 25 is preferably of such link construction, as shown, as completely to occupy the groove and thus to avoid pockets of air in a tire built upon the core assembly, although this is not entirely essential, as my invention includes other features whereby the harmful pocketing of air is avoided.

The inner metal body of each of the absorbent core sections is preferably formed with numerous apertures 26, 26 (Fig. 6), each of which is covered by a perforate member such as a piece of wire netting 27, to admit moisture from the overlying porous material 15 into the hollow interior of the core section.

The inner metal body portions of the absorbent core sections 10 to 13 are preferably first formed as a single annular casting, having at each plane of division between sections an integral zone of metal of full section, such as the zone shown at $a$ or at $b$ in Fig. 4, so that the annulus, either before or after the porous material 15 is cast thereon, may be cut through on such planes, as at $c$ or $d$, Fig. 4, to divide the annulus and thus to provide the sections with metal end faces adapted to interfit in proper planes for the easy removal of the sections from a tire built and vulcanized thereon, the section 10, as shown in Fig. 4, being the key section.

The metal core sections 18 to 21 are adapted to be withdrawn, by means of the collapsible spider 17 upon which they are mounted, from a pneumatic tire 28 built upon the core assembly while the absorbent sections are mounted upon the spider as shown in Figs. 1 and 4, so that the tire with the absorbent core sections remaining therein may be transferred to the molding and vulcanizing apparatus.

The said apparatus comprises, Figs. 2, 6 and 7, a pair of bead molding rings 29, 30 adapted to fit within the beads of the tire and to extend a substantial distance radially on the outer faces of the respective beads of the tire, or, as in some manufacturing plants, the bead molding rings may be formed integrally with the respective mold sections. The apparatus here shown comprises a pair of mold sections 31, 32 adapted to embrace the tire assembly and the bead molding rings and with the latter to enclose the tire assembly. The molding rings 29, 30 are formed with respective mating notches to accommodate the apertured stem 33 of a flexible bead closing ring 34. The said ring preferably is composed essentially of vulcanized rubber and is adapted to fit between the beads of the tire to close the space between them against the escape of a distending material forced into the tire through the stem 33, and is formed on its outer periphery with a series of circumferentially disposed lugs 34$^a$, 34$^a$, which may be reinforced with fabric or metal and are adapted to fit into the groove 16 of the series of porous core sections to center the latter in the tire as it is expanded.

The ring 34 is preferably formed at its respective sides with annular flexible wing portions 35, 35 adapted to seal against the inner faces of the respective bead portions of the tire, in the manner of a lip gasket, under the force of a plastic distending material 36.

The said material preferably consists of a suitable comminuted clay plasticized with about 40 to 50 parts by weight of water to 100 parts by weight of clay. I find that the commercial clay known as Atlas ball clay and used as a base in the ceramic industry is highly desirable in that it requires a comparatively small amount of water to plasticize it sufficiently, and I find that the plasticized clay with a given content of water is rendered more flowable and yet sets promptly under water-expelling pressure when from 1 to 2 parts by weight of water glass to 100 parts of the clay is added to the mixture and thoroughly dispersed therein. The water-glass consequently permits the use of a relatively small quantity of water, and it also apparently expedites the passing of the water from the clay under pressure.

The bead closing ring 34 is formed on its outer face with shallow circumferential grooves 37, 37, Fig. 2, adapted to permit a comparatively free flow of the plastic material 36 therein circumferentially of the tire.

Figure 5:
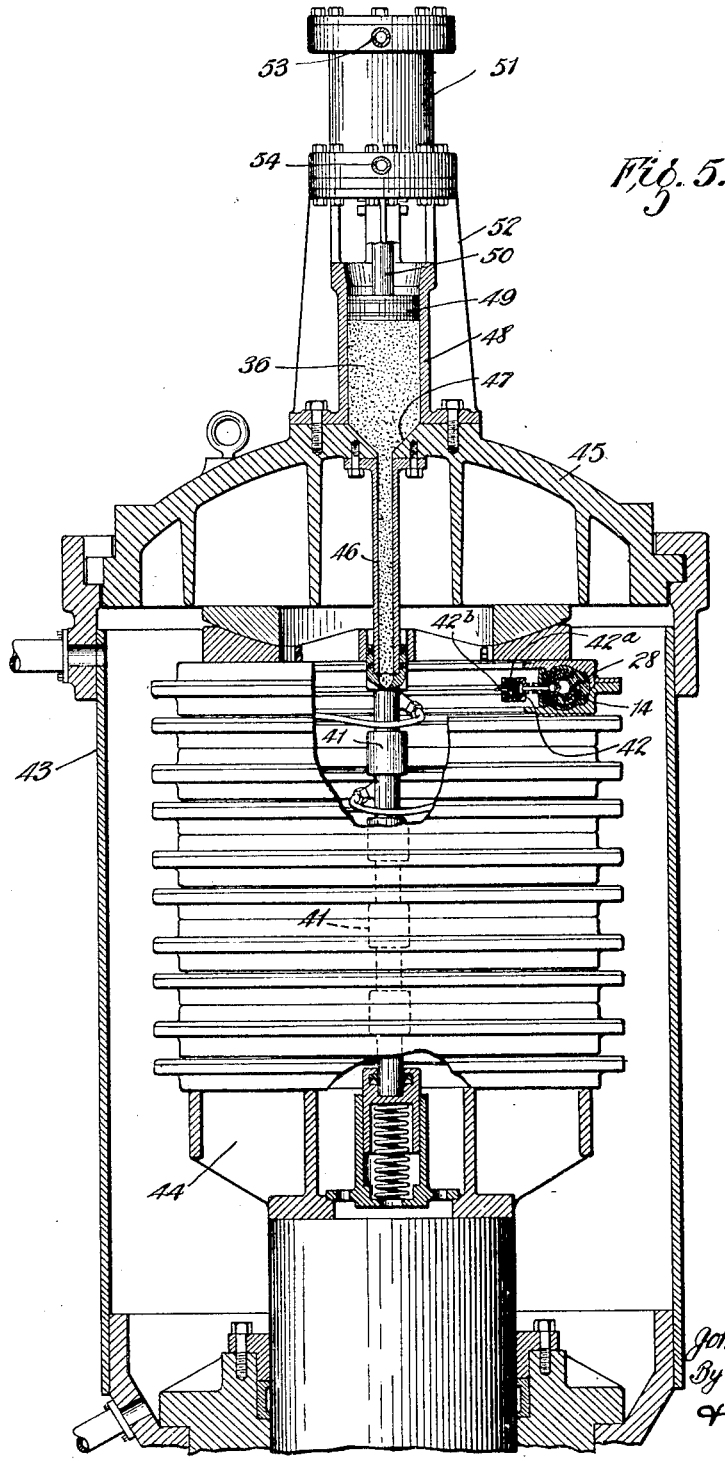
Fig. 5 is a vertical section of vulcanizing equipment, parts being shown in elevation and parts being broken away, the said equipment embodying and being adapted to carry out certain steps of my invention in its preferred form.

The inlet stem 33 of the bead closing ring is provided with a quick detachable coupling 38 for connecting it with a flexible branch pipe 39 leading from an outlet nipple 40 which projects from a section 41 of a jointed manifold, preferably at an angle of about 45° to the axis of the said section 41, as shown clearly in Figs. 5 and 6, for easy flow of plastic distending material from the manifold into the branch pipe.

At a position diametrically opposite the inlet stem 33 of the bead closing ring, the bead molding rings 39, 40 are formed to accommodate, and the bead closing ring is provided with, a valve 42 adapted to be held slightly open by a spring 42$^a$ to permit air to escape from the annular space between the porous core sections and the bead closing ring as the plastic material is forced into the said space through the inlet stem 33 and is caused to flow circumferentially, in both directions, from the inlet stem 33 to the escape valve 42, the valve being so held against extensive opening, by a stop pin 42$^b$, that the valve will be closed to prevent the escape of the plastic material when the latter reaches the position of the valve.

The employment of such means for ridding the tire of air is not of great importance, however, when the porous tire-building core is used, as the core not only fits the tire snugly and thus avoids the presence of a large quantity of air within the tire, but also is adapted to receive air forced thereinto by the flow of the plastic material.

In Fig. 5 a plurality of mold assemblies such as that just described are mounted in a vulcanizer 43, the molds being held closed in the usual manner by the ram 44 of the vulcanizer, and the manifold sections 41, 41 of the several mold assemblies are assembled in a stack to form a manifold for conducting the plastic distending material 36 concurrently into the tires of the several mold assemblies.

Mounted upon the cover 45 of the vulcanizer and extending downward therefrom into sealed communication with the uppermost manifold section 41 is a pipe 46 which is in communication, through a tapered aperture 47 in the vulcanizer cover, with an extruding cylinder 48 mounted on top of the cover and provided with a plunger 49 secured upon the end of the piston-rod 50 of a hydraulic cylinder 51 which is mounted upon an arched bracket 52 rising from the vulcanizer cover and is provided with suitable flexible pipes 53, 54 for actuating the piston therein, the said plunger 49 being adapted to force the plastic distending material 36 from the cylinder 48 and through the manifold into the interiors of the tires 28 mounted within the mold assemblies.

As alternatives to the vulcanizer here shown various types of vulcanizing equipment, including "watch-case" vulcanizers, may be employed, and the plastic clay may be conducted to the tires from a large supply mass thereof maintained under constant pressure at a considerable distance from the vulcanizers.

In the operation of the above-described apparatus in the practice of my invention in its preferred form, the chuck 22 being collapsed, the absorbent core sections 10 to 13 are assembled, preferably upon a horizontal surface, with the annular chain 25 lying within the groove 24 and encircling them as a set. The annular set of core sections is then transferred to the chuck, the key section 10 being suitably held outward by hand to maintain the core sections in proper relation until the assembly is brought into a vertical plane, after which they may be handled by engagement with the key section 10 only without danger of their shifting from their proper relative positions.

When they have been brought into position about the collapsed chuck the hinged chuck sections 20 and 21 are swung outward into position and the key section 10 is raised in the usual manner while the porous core assembly continues to be supported by hand engagement with key section 10 until the key section 18 of the chuck assembly is sufficiently extended, whereupon the two sets of core members become in effect a single tire-building core.

The tire 28 is then built in the usual manner upon this assembled core structure.

The chuck 22 is then collapsed, withdrawing the metal core sections 18 to 21 from the tire and the latter with the porous core sections 10 to 13 therein is removed and the flexible bead closing ring 34 is mounted between the bead portions of the tire in substantially the position shown in Fig. 6.

The bead molding rings 29, 30 and the mold sections 31, 32 in a warm condition, as is usual in production, are then mounted upon the tire assembly as shown in Fig. 6, and a plurality of the mold assemblies are stacked upon the ram 44 of the vulcanizer and connected up with the manifold by means of the flexible pipes 39, the form of the manifold sections 41 here shown being such that each section 41 of the manifold may first be connected with its respective mold assembly and the manifold sections then stacked upon each other in succession to build up the manifold as the successive mold assemblies are added to the stack upon the ram 44.

When the stacks of mold assemblies and manifold sections are thus completed (see Fig. 5) the cover 45, carrying the pressure devices above described, is mounted upon the vulcanizer, the pipe 46 being mated with the uppermost manifold section 41 as shown in Fig. 5.

The apparatus then being as shown in Fig. 5, the ram 49 is actuated to drive the plastic material 36 through the manifold and through the several branch pipes 39 into the respective tires contained within their molds.

As the plastic material enters each tire through the inlet stem 33 it first flows in both directions in the circumferential grooves 37, 37, driving the air ahead of it, to the escape valve 42, where the air escapes from the mold assembly, the valve then closing when contacted by the plastic material and preventing the escape of the latter. It is not essential that all of the air be thus eliminated from the tire, however, as the injection of the plastic material will drive the residual air into the porous core.

As the plastic material continues to be forced into the tire through the inlet stem a pressure is built up in the plastic material, causing it to press the bead closing ring 34 inwardly and wedge it between the bead portions of the tire to compress and mold the latter and to anchor them in position and the injecting pressure upon the plastic material causes it to flow upward around the sides of the core structure and thus to distend the tire within the warm mold, which promptly heats and softens the outer surface region of the tire so that the fibrous elements of the tire are free to expand in true circular section while the rubber of the tread portion of the tire conforms to the mold. The vulcanizer is then charged with steam, further heating the molds.

The inner region of the tire for a time, preferably until the tire is completely expanded and molded, continues to be comparatively cool, so that during the distending of the tire by the plastic material and the shaping of the softened exterior of the tire against the mold the innermost ply of the tire remains impervious, because of its comparatively low temperature, and prevents the penetration of the plastic material, or of fluid from the plastic material, into or through the inner plies of the tire.

As the stretching of the tire is stopped by the enclosing mold a very high pressure is built up in the plastic material as a result of force applied to the plastic material by the ram 49, with the result that moisture is pressed out of the plastic mass into the porous material 15, as well as being absorbed therein by capillary action, some of it also passing through the perforate members 27 into the interiors of the core sections. Thus the clay mixture between the core and the tire becomes stiffened by the loss of moisture, while the inner plies of the tire still remain sufficiently cool to prevent penetration of moisture thereinto.

I preferably apply such force to the ram 49 as to produce a static pressure of from 100 to 400 pounds to the square inch at the entrance to the tire, but the amount of pressure required will vary somewhat with other conditions. The porosity of the cores, the pressure applied to the plastic distending material, the heating of the tire, and the character of the latter should be so correlated that the tire will be completely distended and molded before the plastic material becomes too much stiffened for proper flow and before the inner plies of the tire become excessively softened.

As the plastic material between the core and the tire becomes set or stiffened by loss of moisture it provides a mechanical support for holding the tire distended against the mold, although the plastic material may still contain a considerable amount of moisture at this stage, and such mechanical support prevents retraction of the inner plies when the rubber thereof becomes softened, and the several plies are so held compacted against the mold by the mechanical support provided by the stiffened distending material that any steam or moisture within the said material is prevented from penetrating the plies, since the space between the stiffened distending material and the mold is so completely occupied by the tire materials under pressure that there is substantially no available space within the structure of the tire wall for such steam or moisture to pass into. The pressure upon the tire materials at this stage may be due in part to the swelling of the rubber, although such swelling of the rubber is partially compensated by shrinkage of the stiffened plastic material.

When the tire has thus been distended and molded and the plastic material between the core and the tire has been suitably stiffened as described, the vulcanization of the tire may be completed by continuing the steam pressure within the vulcanizer or, alternatively, for economy of mold equipment, especially in the case of thick-walled tires, the vulcanizer may be blown down and opened and the tire assemblies with the bead molding rings 29, 30 thereon may be removed from the molds and submerged in hot water and the vulcanization completed with the hot water, under high pressure, in direct contact with the exterior surfaces of the tires, the tire assemblies being disconnected from the flexible pipes 39, and the stiffened condition of the initially plastic distending material being such as to prevent retraction of the tires.

During the vulcanization of the tire, whichever procedure is followed, the heat reaching the distending material 36 through the tire causes an evaporation and further escape of moisture from the said material into the porous material 15 or through the latter into the hollow interiors of the core sections, with the result that when the vulcanization is completed and the tire is removed from the core assemblies the distending material is so further solidified and dried that it readily flakes off from the surfaces of the core sections, and also from the inner surface of the tire, leaving the tire and the core sections comparatively clean, so that very little expense is involved in further cleaning the tire or the core as compared with the use of a plastic material which remains plastic during the vulcanization of the tire.

When the vulcanization of the tire is completed the bead molding rings 29, 30, the bead closing ring 34, the core sections 10 to 13 and the chain 25 are removed therefrom, the porous core sections are mounted again upon the spider 22, preferably after being dried, and the process as described is repeated.

As the plastic material remaining in the extruding cylinder, the manifold sections and the flexible pipes is not sufficiently near the porous core to lose very much of its moisture, it remains plastic for injection into the next set of tires.

In Fig. 3 I have shown a modified form of porous or absorbent tire-building core consisting of a complete hollow annulus of porous material such as plaster of Paris, which readily may be cast and which may be broken up for removal from the vulcanized tire and the material thereof ground and mixed with suitable ingredients, such as additional plaster of Paris or gypsum, for use in the casting of successive cores.

The porous portions of the core sections shown in Fig. 1 likewise may be ground for re-use when they become damaged.

The core of Fig. 3 is of suitable form to be substituted for the sectional porous core of Fig. 1 in the above-described building, molding and vulcanizing of the tire.

My invention is not wholly limited to molding or vulcanizing the tire upon a tire-building core upon which it is built, but such procedure is advantageous, especially with respect to tires of large size, as it avoids the operation of mounting a porous or absorbent member within the tire after it has been built and permits the building of the tire upon a core in accordance with tire-building practices now standard with respect to the large size tires.

Various modifications are possible within the scope of my invention and I do not wholly limit my claims to the exact procedure or the specific constructions herein described.

I claim:

1. The method of making a pneumatic tire which comprises assembling the tire and a porous member therein, distending the tire by forcing thereinto a plastic mixture comprising a fluid, and by force applied to the plastic mixture so pressing fluid therefrom into the porous member as to lessen the plasticity of the mixture.

2. A method as defined in claim 1 in which the tire is so heated through its outer surface that the outer surface region becomes substantially softened while the innermost ply of the tire remains sufficiently cool to prevent substantial penetration therethrough of fluid from the plastic material in the distending of the tire.

3. The method of making a pneumatic tire which comprises building the tire upon a porous core structure, enclosing the tire with the core structure therein in a mold, distending the tire against the mold by forcing a plastic mixture comprising a fluid between the porous core structure and the tire, and by force applied to the plastic mixture so pressing fluid therefrom into the porous core structure as to lessen the plasticity of the mixture.

4. A method as defined in claim 3 in which the tire is so heated through its outer surface that the outer surface region becomes substantially softened while the innermost ply of the tire remains sufficiently cool to prevent substantial penetration therethrough of fluid from the plastic material in the distending of the tire.

5. The method of making a pneumatic tire which comprises assembling the tire and a porous member therein, conducting into the tire at one part of its bead circumference a plastic mixture comprising a fluid while venting air from the tire at another part of its bead circumference, stopping the vent, distending the tire by forcing additional material thereinto, and by force applied to the plastic mixture so pressing fluid therefrom into the porous member as to lessen the plasticity of the mixture.

6. The method of making a pneumatic tire which comprises assembling the tire and such solid members including a porous member as almost completely to occupy the space therein, distending the tire by forcing thereinto a plastic mixture comprising a fluid and by force applied to the plastic mixture so pressing fluid therefrom into the porous member as to lessen the plasticity of the mixture.

7. The method of making a pneumatic tire which comprises building the tire, distending the tire by forcing thereinto a plastic mixture comprising a fluid, and stiffening the mixture by removal of fluid therefrom.

8. The method of making a pneumatic tire which comprises assembling the tire and a porous member therein, distending the tire by forcing thereinto a plastic mixture comprising a fluid, and stiffening the mixture by driving fluid therefrom into the porous member.

9. A method as defined in claim 8 in which fluid is driven from the mixture into the porous member by heat applied to the mixture.

10. The method of making a pneumatic tire which comprises building the tire, enclosing the tire in a mold, distending the tire against the mold by forcing into the tire a plastic mixture comprising a fluid, so causing the mixture to set without completely hardening as to provide substantial mechanical support for holding the tire in its distended condition with its plies compressed against the mold, and so driving fluid from the mixture by heating the same while maintaining it in communication with a region of comparatively low fluid pressure as further to harden it.

11. A method as defined in claim 10 in which the tire is so heated through its outer surface that the outer surface region becomes substantially softened while the innermost ply of the tire remains sufficiently cool prevents substantial penetration therethrough of fluid from the plastic material in the distending of the tire.

12. The method of making a pneumatic tire which comprises building the tire, and distending the same by forcing thereinto a mixture of clay, water and water-glass.

13. Tire-making apparatus comprising a porous core member and means for forcing a flowable material between the said member and a tire containing the same.

14. Tire-making apparatus comprising a tire-mold, a bead-closing ring adapted to fit between the bead portions of a tire within the mold and having an inlet passage, a porous core member adapted to lie within the tire, a mass of plastic material, and means for forcing the plastic material through the said inlet passage into the tire.

15. Tire-making apparatus comprising a tire-mold, a bead-closing ring, and a substantially rigid core-structure unattached to the bead-closing ring and adapted to lie within the tire and movable therein with relation to the bead-closing ring.

16. Tire-making apparatus as defined in claim 15 in which the bead-closing ring is deformable.

17. Tire-making apparatus comprising a tire-mold, a bead-closing ring, and a porous core-structure adapted to lie within the tire and movable therein with relation to the bead-closing ring.

18. Tire-making apparatus as defined in claim 17 in which the bead-closing ring and the porous core-structure are formed to interlock with each other against movement in a direction parallel to their axes.

19. Tire-making apparatus comprising a core member and means for forcing a flowable material between the same and a tire mounted thereon, the said member comprising a hollow body formed with an aperture in its wall and a porous member bridging the said aperture.

20. Tire-making apparatus comprising a tire-mold, a bead-closing ring, and a core member adapted to lie within the tire and movable therein with relation to the bead-closing ring, the said core member comprising a hollow body member of which the hollow interior is in communication with the inner surface of the tire only through a porous structure.

21. Tire-making apparatus comprising a sectional core and means for limiting outward movement of the sections of the core when they are assembled as an annulus, each of the said sections comprising a hollow body formed with apertures in its wall, all of the apertures being bridged by porous material.

22. Tire-making apparatus comprising a sectional, substantially rigid core and a bead-closing ring adapted to occupy the tire and to define between them a circumferential conduit, a mass of plastic tire-distending material, means for conducting the plastic tire-distending material into said conduit at one part thereof, and closure means at another part of said conduit adapted to permit escape of air through a passage in said bead-closing ring but to prevent the passage of the said plastic material therethrough.

23. A tire-building core comprising an outer surface portion of plaster of Paris and a porosity-reducing filler therein.

24. A tire-distending material comprising a mixture of clay, water and water-glass.

In witness whereof I have hereunto set my hand this 29th day of January, 1927.

JOHN R. GAMMETER.